Sept. 6, 1960            O. R. OLSON          2,951,491
APPARATUS FOR FEEDING ELONGATED ARTICLES
THROUGH A BATH TYPE FURNACE

Filed April 22, 1953                      6 Sheets-Sheet 3

INVENTOR.
OSCAR R OLSON
BY
HIS ATTORNEY

Sept. 6, 1960 O. R. OLSON 2,951,491
APPARATUS FOR FEEDING ELONGATED ARTICLES
THROUGH A BATH TYPE FURNACE
Filed April 22, 1953 6 Sheets-Sheet 6

INVENTOR.
OSCAR R. OLSON
BY
HIS ATTORNEY

2,951,491
APPARATUS FOR FEEDING ELONGATED ARTICLES THROUGH A BATH TYPE FURNACE

Oscar R. Olson, 209 Boulevard of the Allies, Pittsburgh, Pa.

Filed Apr. 22, 1953, Ser. No. 350,373

15 Claims. (Cl. 134—134)

This invention relates generally to apparatus for feeding elongated articles through a bath type furnace.

Bath type furnaces are generally employed to heat or coat articles, such as pipe sections, conduit, tubing or bar stock with a spelter. When used for heating articles the hot liquid bath is usually salt. In the process of manufacturing uranium metal parts it is desirable to heat bars such as uranium metal before or intermediate the process of rolling the same into elongated sections. Uranium metal is extremely heavy in weight and requires multiple skid supporting sections, where regular iron pipe sections would require only a few supporting skids, yet the same character of furnace and feeding mechanism is employed to heat or coat both of such articles.

In coating steel articles, such as galvanizing pipe, it is desirable to first pickle the pipe in an acid bath, then wash the same, after which it is necessary to dry the pipe before passing it into a spelter bath to avoid drastic action by the spelter. The pickled and washed pipe sections are thus passed through a preheating furnace to thoroughly dry the same before feeding them into the spelter bath. The preheating step also brings up the temperature of the pipe, which aids in the timing cycle required to pass the article through the bath to coat it or heat it to a predetermined degree.

If the article does not require washing or preheating, then it may be fed directly to the bath and thus pass through a predetermined heating or coating cycle.

In order to properly time the article passing through the bath, one may employ a variable speed feeding device, such as a chain conveyor, push conveyor, or a rack in the form of a spoked wheel, or their combination.

One problem lies in the manner of timing the supply to the feeder. In coating pipe, the pipe sections may be delivered to the furnace constantly or intermittently in uniform or nonuniform periods and in varying quantities. However the preheating step may also function as a storage period to iron out the irregular supply. Again the storage may be effected between the preheating chamber and the bath feeding device. The passage of the articles through the preheating chamber as well as the bath may be tied together so that the articles when fed uniformly go through the complete cycle uniformly or if they are initially loaded haphazardly they will continue that way through the cycle.

In the heating and rolling of uranium metal the long sections are usually severed into three or four shorter sections which are more easily handled and can be fed in consecutive order to get the material into the bath. There may be a considerable time until the next series of four articles are fed, yet the feeding device may be operated intermittently to hold the pieces and supply them in uniform timed sequence through the bath. This provides a uniform delivering of the articles from the bath. When the articles are moved through the kettle at a uniform rate they also may be delivered from the kettle at a uniform rate.

Different methods may be employed to remove the articles from the bath type furnace. The delivering mechanism may move the articles longitudinally from the kettle. The articles may be raised and dragged out of the bath along an upwardly sloping angle that permits the bath material to drain and be blown back toward the tank. The articles may be lifted out of the kettle by hand or by eccentric wheels, or by a lift hook. Regardless of how the sections of articles are raised, one end may be placed in contact with a series of magnetic conveyor rolls which drag the other end of the pipe out of the bath and thus allow it to drain.

Another method of discharging long sections such as uranium metal bars is to push them out of the end of the kettle through a controlled opening onto a conveyor that carries it along to the next operation. Some of the bath escapes this way but the kettle can be constructed with a sump just outside of the discharge hole to receive all the hot liquid bath that escapes, which is immediately pumped back into the kettle. Such a pusher may be a piston rod or an endless chain having a depending arm to engage the end of the uranium member and shove it out the controlled discharge opening.

The character of article put through the furnace depends somewhat on the manner that it is handled. The heating of long lengths of uranium necessitates the use of many closely spaced supports, since this metal is fairly soft when heated and it is approximately four times heavier than steel. It is thus far better to merely shove the uranium section out of the furnace longitudinally onto a conveyor that will take it to the rolls for further shaping and lose some bath into a sump where it can be returned to the kettle rather than to lift the uranium piece.

Since steel pipe and bars are not as soft and flexible when heated to the temperature of the ordinary bath type furnaces they do not need to be supported at such close intervals and they can be readily lifted out of the kettle furnace.

Other objects and advantages appear hereinafter in the following description and claims.

The accompanying drawings show for the purpose of exemplification without limiting the invention or claims thereto, certain practical embodiments illustrating the principles of this invention wherein:

Figure 1:
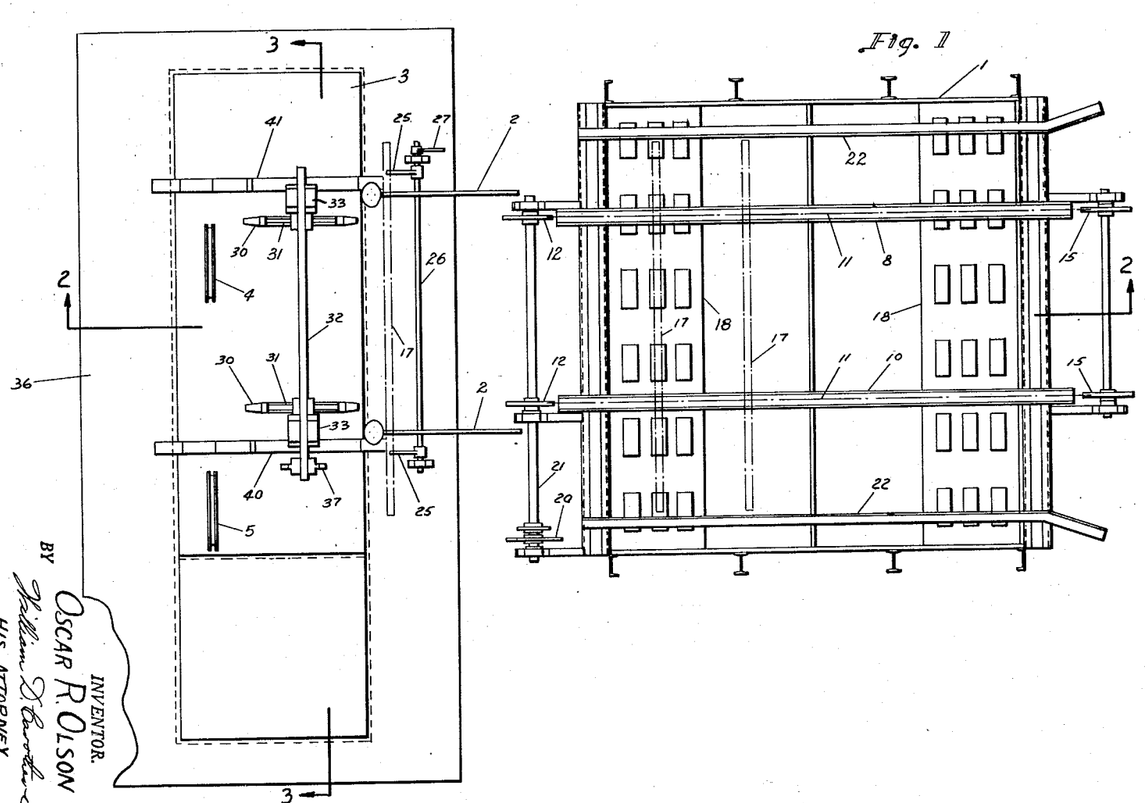
Fig. 1 is a view in horizontal section showing a preheating chamber and the kettle showing the article bath conveying mechanism.
Figure 2:
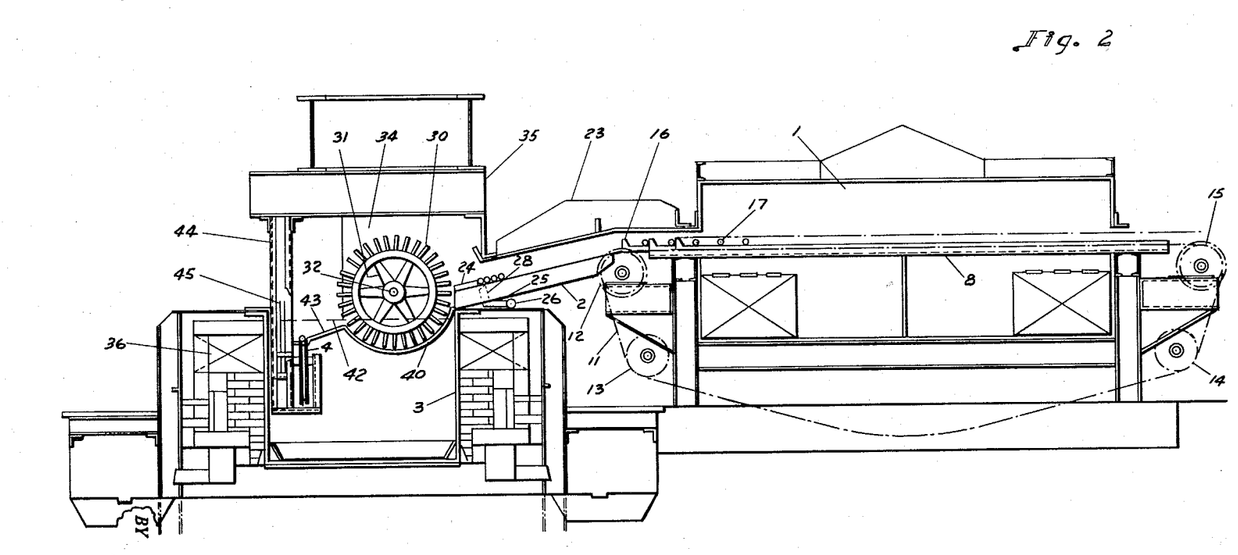
Fig. 2 is a view in vertical section taken along the line 2—2 of Fig. 1.
Figure 3:
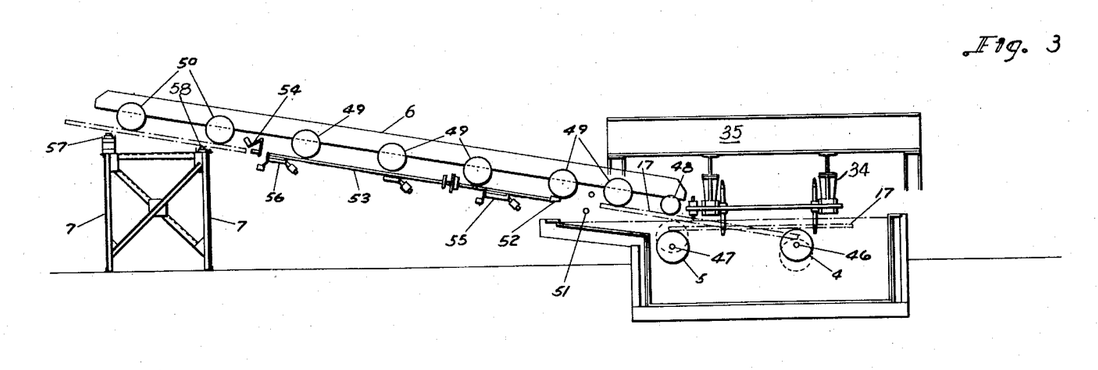
Fig. 3 is a view in vertical section showing the article take out mechanism for the kettle shown in Figs. 1 and 2.
Figure 4:
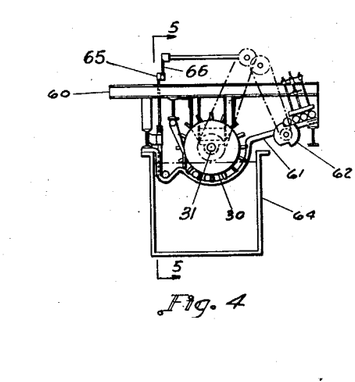
Fig. 4 is a view in vertical section showing a modified article take out mechanism for a bath type furnace.
Figure 5:
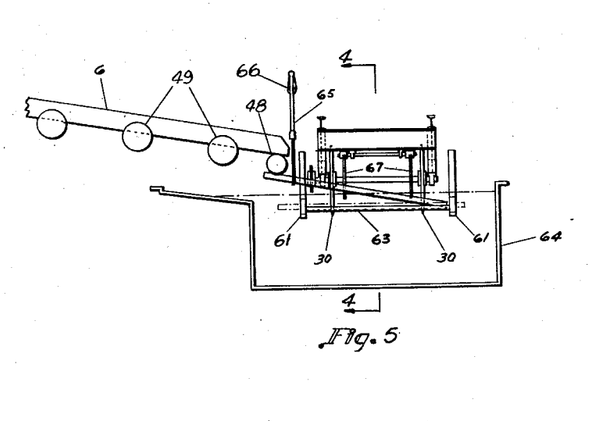
Fig. 5 is a view in vertical section taken on the line 5—5 of Fig. 4.
Figure 6:
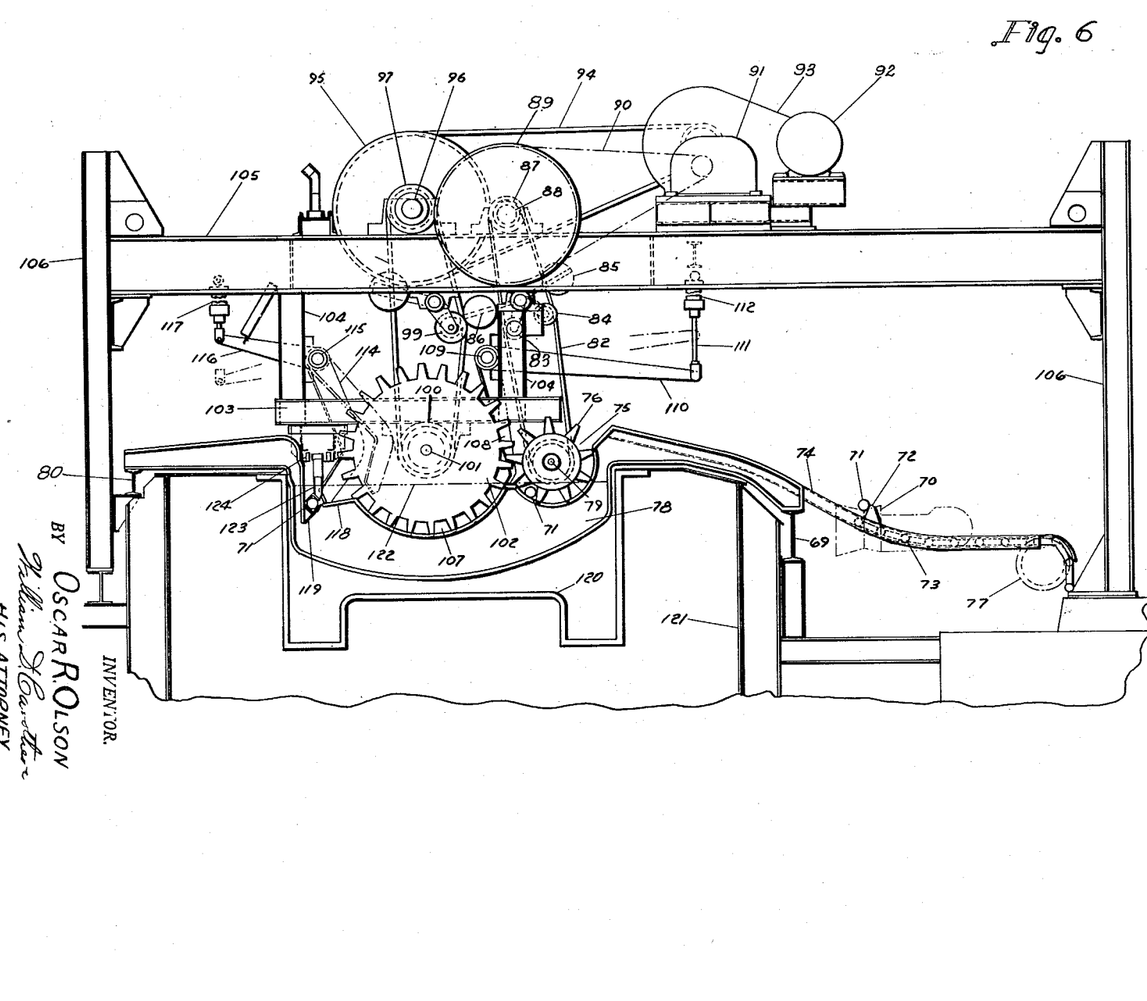
Fig. 6 is a view in vertical section of a kettle furnace for heating uranium sections.
Figure 7:
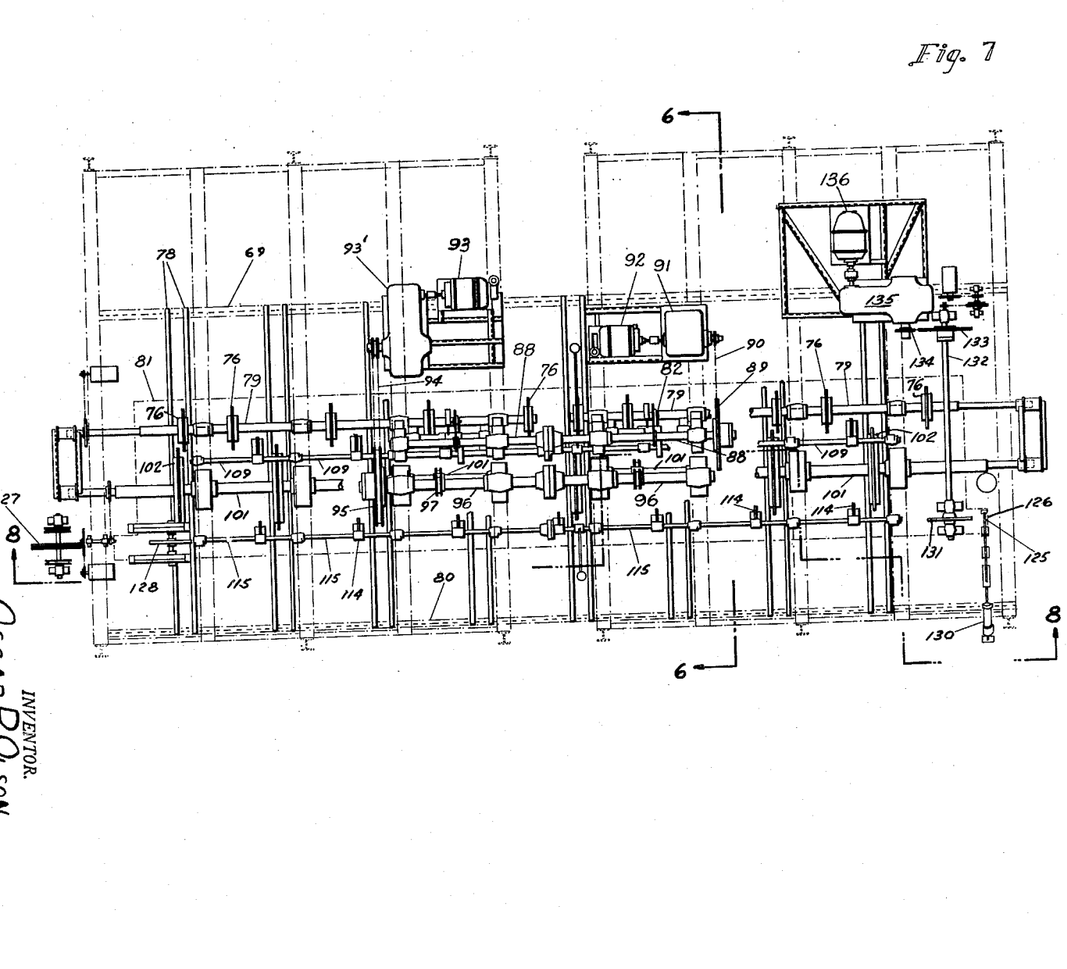
Fig. 7 is a plan view of the structure shown in Fig. 6 with parts broken away.
Figure 8:
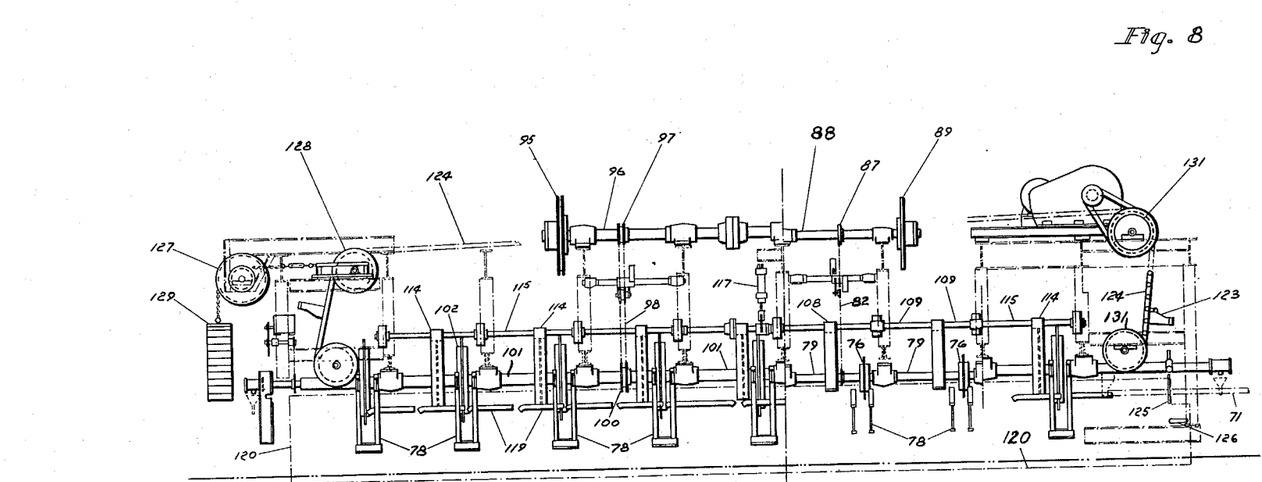
Fig. 8 is a view in vertical section taken along the line 8—8 of Fig. 7.

Referring to the drawings, Figs. 1 to 3 are directed to a kettle furnace for heating or coating steel pipe or rods and which is provided with a preheating furnace and an eccentric wheel discharge. Figs. 4 and 5 also show kettle furnaces for coating steel pipe and rods. A hook is employed in this structure to lift the articles from the kettle bath. In Figs. 6 to 8 the kettle can be used for steel pipe and bars or rods, but it is also adapted to handle long lengths of uranium bars for heating the same before or intermediate the rolling process.

The structure shown in Figs. 1 to 3 provides a preheating furnace 1 which receives and conveys the steel pipe or bars therethrough and discharges them down the chute 2 to the edge of the kettle 3 containing a bath that is heated to its molten state and through which the steel articles are passed for the purpose of heating or coating the same. The articles are subsequently raised for discharge by the article handling means in the form of eccentric conveyor wheels 4 and 5 out of the furnace to the magnetic discharge conveyor as indicated at 6 in Fig. 3, where the article is wiped and subsequently deposited on the cooling or drying frame 7.

Referring particularly to Figs. 1 and 2, the preheating furnace is provided with a pair of upwardly open channel skid members 8 and 10, each of which contains a conveyor chain as indicated at 11 that extends over the sprocket members 12, lower sprocket members 13 and passes back underneath the furnace and over the lower sprocket members 14, thence up over the front sprocket members 15. Each conveyor chain 11 is provided with a series of spaced upwardly projecting abutments 16 which engage behind the pipe 17 as illustrated in Fig. 2 and rolls the same along the channel skids 8 and 10 through the preheating furnace.

As illustrated, the preheating furnace 1 is provided with the heating elements 18 at each end thereof. Other forms of heating means may be placed within the chamber for the purpose of heating the pipe. The pipe ordinarily is required to pass through a pickling bath and is subsequently washed, before feeding it to the preheating furnace 1 and any water thereon is dried in this furnace.

The pipe sections are fed by the conveyor members 11 and are picked up by the abutments 16 and carried through the furnace 1 on the skids 8 and 10. The chain conveyor 11 is driven through the sprocket 20 shown in Fig. 1, from an overhead drive that operates the other mechanism for feeding the pipe through the kettle. The sprocket 20 is fixed on the shaft 21 on which the sprocket members 12 are secured. The sides of the furnace are provided with the angle guide members 22 to keep the pipe sections in line as they travel through the furnace. As the pipe sections travel through the furnace, they proceed at a rather slow rate in order to properly heat the same which also dries them off. They are then shoved onto the inclined skidway 2 which is covered by the shield member 23. The pipes roll down the skidways 2 until they engage the abutment 24. The pipe members rest against the abutments 24 and a rocker lifting mechanism, indicated by the rocker arms 25 fixed to the shaft 26, is actuated by the lever arm 27 and rotated in a clockwise direction as shown in Fig. 2 to raise the same. The spaced upwardly projecting portions 28 are shaped to selectively engage the first pipe 17 and lift it above the abutments 24 and permit it to roll down onto one of the open pockets 30 of the pair of feeder wheels 31 on the shaft 32. This feeder wheel is provided with thirty of such pockets and is rotated by the same drive mechanism that operates the conveyor chain 11 and the intermittently operated ejector member 25. The shaft 32 is journaled in the bearings 33 as shown in Fig. 1 and is suspended by the carrier members 34 from the frame structure 35. This whole structure may be raised and removed from the vicinity of the kettle 3 in the furnace.

The shaft 32 is driven through the sprocket 37 and when the pipe section drops into aligned pockets 30 of the two feeder wheels, they are carried in a clockwise direction downwardly past the ends of the skids 2 until the pipe comes in engagement with the arcuate skids 40 and 41 which are on opposite sides of the wheels 31 and are sufficiently long to support the pipe while it descends into the bath, the level of which is indicated at 42. This bath may be a spelter for the purpose of coating the pipe or it may be a salt for merely heating the same. Nevertheless, the ferris wheel type conveyor wheels 31 slowly move the pipe around the arcuate skids 40 and 41 until they come to the discharge slope 43 of the skids 40 and 41 which permits the pipe to roll out of the aligned pockets 30 and roll down onto the surface of the immersed and grooved rotary driven eccentric wheels 4 and 5 which may be termed article handling means or article discharge actuating means in the claims and are supported from the hanger 44 and are rotated by a chain drive arrangement as indicated at 45 from the same source of power that drives all of the other moving parts in this mechanism in order that their speed be maintained in uniform timed relation with each other. The groove of each of the eccentric wheels provides the seat means in the liquid bath for receiving the articles and since there are two eccentric wheels each having a groove this seat provides two supports as claimed. When the pipe section 17 first rests on the eccentric wheels 4 and 5 the pipe section 17 is horizontal as indicated at Fig. 3. However, the shaft 46 which is higher than the shaft 47 and supporting the eccentric wheel member 4 on the shaft 46, is supporting the pipe on its longest radius; whereas the shaft 47 supporting the eccentric wheel 5 is supporting the pipe on its shortest radius. Upon the rotation of these shafts 46 and 47 in a counterclockwise direction as shown in Fig. 3, the eccentric wheel 5 raises one end of the pipe in the air, whereas the eccentric wheel 4 lowers the other end of the pipe. This permits the pipe to take an inclination as indicated in dotted lines in Fig. 3 before passing out of the liquid bath and the pipe becomes engaged by the first magnetic roller 48 of the discharge conveyor or dragout mechanism 6. The discharge conveyor or dragout mechanism is provided with an additional series of magnetic rollers 49 and is also provided with a pair of electromagnetically operated rolls 50. When the pipe is dragged out of the bath, it is passed through the steam-spraying annular nozzle 51 which wipes the exterior of the pipe. The pipe then travels onwardly over the head 52 of the mandrel 53. The mandrel 53 is supplied with steam through the head member 54 which wipes the interior of the pipe as it travels upwardly along the rotary conveying magnetic rollers 49. When the pipe section passes off the head 52, the mandrel is supported by the head clamp member 55. The tail clamp member 56 releases the mandrel 53 until the pipe passes off the mandrel and is supported by the electromagnetic rolls 50. When in proper position over the cooling or drying rack 7, the electromagnetic rolls 50 are deenergized which permits the pipe to drop a very slight distance onto the conveyor lines 57 and 58, which carry the pipe along its circuit permitting it to cool while it rolls and at the same time distribute the coating uniformly over the inner and outer surfaces of the pipe.

When the pipe is fed to the structure as shown in Figs. 1 to 3 in uniformly spaced positions, it will be continued through the whole of the cycle including preheating, bath-heating at a uniform rate and then will be discharged by the intermittent operation of the eccentric wheels 4 and 5 which may be operated at a faster rate to speed up the discharge of the pipe from the tank. However, the eccentric wheels may be operated at a constant speed and continue the pipe through the whole cycle at an even and uniform rate for loading, treating and discharge.

In the structure as shown in Figs. 4 and 5, the pipe may be discharged from a preheating furnace such as indicated at 2 in Fig. 1 and as it passes down onto the skids 61, it engages the spaced rotary stop members 62 which are adapted to selectively receive only one pipe section, which when rotated permits the selected pipe section to be rolled down the skids into the pockets 30 of the wheels 31, wherein it is carried through the bath furnace and discharged from the pockets 30 into the trough such as indicated at 63 supported by the spaced skids 61 within the tank 64, which trough provides the seat means in the liquid bath for receiving the articles and since there are two skids 61 this seat has two supports as claimed. The skids 61 support the trough 63. The article handling means in the form of hook member 65 which is operated from a rotary crank 66 lifts the discharge end of the pipe and engages the same to the magnetic roll 48 of the discharge dragout member 6 while the opposite end of the pipe is dragged along the trough member 63. The length of the trough 63 is sufficient to prevent the section of pipe being conveyed through the furnace to fall down into the tank 64 regardless of whether or not it slips off the hook 65. However, if it does slip off the hook 65, the hook may be again rotated to pick up the same and place it into contact with the leading magnetic roll 48 of the dragout.

The selector member 62 is a rotary rather than a reciprocating device, and it may operate intermittently or continuously to perform its duties in selecting the first pipe member on the skids 61 to be passed onto the bath.

As previously stated, the structures as shown in Figs. 6, 7, and 8 show a furnace for the purpose of heating uranium sections before or intermediate rolling stages. As shown in Fig. 6 the section comes in on the motor operated conveyor rolls 70. The uranium section is indicated at 71, and it is engaged by the abutments 72 which may swing in a counterclockwise direction to pass under the section 71 but are held upright on conveyor chain members 73 when moved into engagement with the uranium member 71 and causes the same to be slid along the inwardly open channel members 74 to the ends of the skids. Each section then drops down to the spaces 75 on the feed sprocket wheels 76. The conveyor chains 73 are actuated by the sprockets 77 and merely reciprocate up and back in the channel sections 74. A series of these conveyor members are supplied as illustrated in Fig. 7.

Aside from the upwardly open channels 74 which form skids for supporting the uranium member 71 as it is fed to the kettle, the kettle itself is provided with a series of structural beam skid members as indicated at 78, which are supported on their ends by the I-beams 69 and 80. These structural beam members have a central web portion and flanged at top and bottom surfaces. The top surfaces form the skids along which the uranium members are rolled or shoved. These skid members 78 are mounted in pairs and there are a considerable number of pairs used in conjunction with a kettle of the size indicated at 120, owing to the fact that the uranium member is considerably heavier than that of steel being approximately four times its weight.

As the uranium section drops into the pocket 75 of the feeding sprockets 76, the latter is operated intermittently through the chain member 82 which passes over the idler members 83 and 84 having their corresponding weights 85 and 86 to keep the tension on the chain 82. The chain 82 rides over the sprocket member 87 which is fastened to the shaft 88 on which the large sprocket wheel 89 is secured and which is driven by the chain 90 from the intermittent actuating device 91, as shown in Figs. 6 and 7.

The motor 93 is provided to drive the reducing mechanism 93' for the purpose of operating the chain 94 to rotate the sprocket 95 on the shaft 96 for the purpose of driving the wheel sprocket 97 operating the chain 98, which is also engaged by the weight idler 99 and drives the sprocket 100 on the shaft 101 to operate the ferris wheel type feeder 102. The shaft 101 is supported from bearings suspended from the I-beam 103 carried by the vertical members 104, frame 105 supported on the columns 106.

When the uranium section is rolled into long sections, each is cut into four sections in rapid succession and are moved by the motor conveyor rollers 70 and are quickly deposited into the intermittently operated feeder wheel 76. However, the wheel 102 operates at a constant speed and at a materially slower rate. The wheel 76 may receive four sections of the uranium in a relatively short period of time, and by the time it feeds these four sections into the open pockets 107 and the wheel 102, the next set of four sections of uranium are fed in succession by the conveyors 70 and thence by the conveyors 73 to the indexing wheel 76 in readiness for depositing the same in the slow moving timing wheel 102 passing the uranium section over the arcuate skids 78. The operation of the feeder wheel 76 determines the operation of the conveyors 73.

In order to insure the heating of the uranium sections 71 passing from the feed gears 76 to the feed conveying wheels 102, a lever 108 is employed which is pivoted on the shaft 109 operated by the lever 110 which in turn is connected by means of the connecting rod 111 to the fluid actuated cylinder 112. When it is desired to recirculate the uranium members 71 on the sprocket 76, the lever 108 is left in the position as shown, and the uranium members 71 are carried around the sprockets 76. If, however, it is desired that they be fed into the wheel 102, the levers 108 are swung in a counterclockwise direction by the raising of the lever 110. When the levers 108 are in back of the uranium members 71, and the cylinder 112 is energized to swing the lever 110 in a clockwise direction, the uranium members are kicked from one wheel 76 to the pockets 107 of the wheel 102.

The conveying wheels 102 are provided with discharge levers as indicated at 114. These levers are from the shaft 115 which in turn is operated by the lever 116, actuated by the cylinder 117. When each pocket 107 presents itself to the discharge position, the lever 114 has been moved to the right in Fig. 6 which is the start position. Upon the proper timed impulse given to the cylinder 117, the uranium section is ejected from the pockets 107 across the skid sections 118 into the pocket member on seat means 119 which is made up of several sections as shown in Fig. 8 and has several supports. It will be noted that the uranium section has remained in the bath substantially the whole of the time that it has been conveyed by the wheels 76 and 102 which are immersed in the kettle 120. After the uranium has traveled to the trough or seat means 119, it still remains in the baths, the surface of which is indicated at 122. This period of time is sufficient to have properly heated the section and the article handling means in the form of depending arm 123 of the conveyor chain 124 engages the end of the uranium section 71 and shoves it longitudinally along the trough members or seat means 119 to the right in Fig. 8 and thus slides the uranium member 71 through the gate 125 in the kettle 120. A sump 126 is provided below the gate 125 to catch any material that flows from the tank when the gate 125 is open to permit the member 71 to be discharged longitudinally out of the kettle. As shown in Fig. 6, the conveyor 124 has two abutment arm members 123, one illustrated at each end of the drawing of Fig. 8 which permits this conveyor to discharge one section 71 of the uranium immediately following the preceding section. The discharge conveyor 124 may also be operated intermittently.

As shown in Fig. 8 the conveyor member 124 is provided with a takeup 127 which is performed by pulling on a slide supporting sprocket wheel 128. The slide is urged to the left by the weight members 129. This takes up the play in the chain conveyor 124 in accordance with the weights added. The chain of this conveyor does not enter the bath, but the depending projections 123 do and these engage the end of the uranium sections forcing out through the gate 125. The gate 125 is actuated by the cylinder and crank mechanism 130 as shown in Fig. 7. The sprocket 131 is shown in Fig. 8 mounted on the shaft 132 and is driven through the sprocket 133 and a chain from the small sprocket 134 and the variable speed reducing mechanism 135 is in turn operated by the motor 136.

Figure 9:
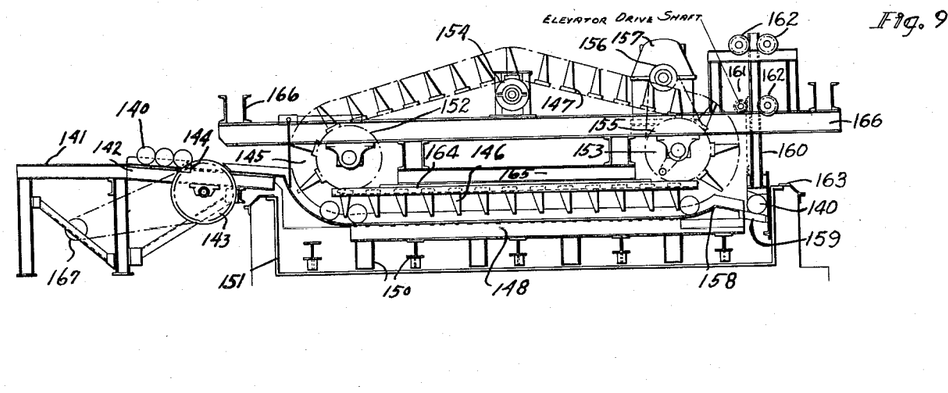
Fig. 9 is a view in vertical section illustrating a structure having a series of endless chains for conveying articles through a bath type furnace with an elevator for discharging them.

When small articles are to be heated in a bath type furnace, and they are not as long as the kettle furnace is wide, a feeding structure such as illustrated in Fig. 9 may be employed wherein the uranium members such as illustrated at 140 are supported on the receiving deck 141 and permitted to roll on the skids 142 to the feeder wheel 143 which is provided with a notch 144 for permitting it to deliver one piece at a time to the opposite side thereof where it may roll down the skids and into the pocket 145 formed between the projections 146 of the conveyor member 147. A series of article supporting skids 148 are mounted on the substructure 150 within the kettle 151 but the same may be raised therefrom if the kettle is required to be removed for repairs or replacement.

The conveyor 147 is an ordinary chain conveyor with a multiple series of the depending abutments 146. This conveyor travels along around the sprocket wheel members 152 and 153 at opposite ends of the kettle and over the takeup sprocket member 154. This conveyor is driven through the chain drive 155 from the shaft on which the sprocket 153 is mounted. The chain 155 passes around the small sprocket 156 mounted on the motor reducing mechanism as indicated in 157. As the heavy pieces being heated pass through the bath they are rolled over the discharge hump as indicated in 158 and slide down into the elevator seat 159. The elevator is actuated by vertical rack member 160 driven by the pinion 161 and guided by the roll members 162. The elevator member is raised for the purpose of discharging the piece 140 over the discharge skid members 163 where it may roll onto a conveyor or other member preparatory for conducting the same to the next step in operation which in all probability would be a rolling mill for reducing the diameter of the member.

The abutments of the conveyor member 147 are supported by the inturned flanges 164 which are mounted on the steel structure 165 which in turn is suspended from the main frame 166. By providing the inturned flange 164 to support the abutments 146 as they travel longitudinally through the bath, the chain of the conveyor is kept out of contact with the liquid of the bath.

The main frame 166 may be raised to remove the whole of this mechanism including the elevator and elevator seat from the vicinity of the furnace.

Although the reducer drive member 157 is shown as independent drive from the motor drive means 167 for the feeder wheel 143 the two may be interconnected so that they operate in conjunction with each other for properly feeding the pieces 140 as the pockets 145 are presented in the feeding position. In this structure the articles are round and they are permitted to roll by gravity along the skids within the kettle. The skids 148 may be slightly tilted from one end to the other to enhance their rolling characteristics through the kettle. The only time a real load is placed in the conveyor 147 is when they are raised over the discharge hump 158 and when they are raised by the elevator member as indicated at 160.

A heavy substructure is required to support the members of this character in the bath furnace owing to the fact that these articles may well be uranium metal which are exceedingly heavy, weighing approximately twice the amount of lead. The conveyor 147 is likened unto the ferris wheel although it is not a fixed wheel but nevertheless it provides a series of pockets 145 which present themselves in turn and slowly pass through the bath for the purpose of moving the articles continuously through the bath and at a speed allowing them to remain in the bath a sufficient amount of time to properly heat the same.

The terms article discharge actuating means and the article handling means as employed in the claims may include the hook member 65 operated from the rotary crank 66, or they may include the depending arm 123 of the conveyor chain 124.

I claim:

1. A device for initially moving one end of each of a succession of elongated articles out of a hot liquid bath in a kettle furnace to a discharge conveyor which comprises a feed conveyor means in the liquid bath to feed the articles therethrough with their axes normal to the path of movement and in succession through the bath to treat the same, an article handling means immersed in the liquid bath at the end of said feed conveyor means independent of the same and comprising a plurality of supports with at least one of said supports being movable to receive each article in turn and to move each article in turn in a direction longitudinally of its axis and in a direction at right angles to the direction of movement of said feed conveyor with one end of the article moving initially upwardly out of the liquid bath and to the discharge conveyor.

2. The structure of claim 1 which also includes gate means in the wall of the kettle furnace, and gate operating means to open said gate and permit the articles to pass in moving out of the liquid bath while submerged and for closing said gate after the article has completely passed from said bath.

3. The structure of claim 1 characterized in that said article handling means in the liquid bath which moves one end of the article upwardly out of the liquid bath to the discharge conveyor is an elevating hook means.

4. The structure of claim 1 characterized in that said article handling means in the liquid bath which moves one end of the article upwardly out of the liquid bath to the discharge conveyor is a wheel eccentrically mounted on a rotary shaft.

5. The structure of claim 4 characterized in that said article handling means also includes a second wheel eccentrically mounted on a rotary shaft to lower the other end of said article to gain height for said one end of said article in delivering it to the discharge conveyor.

6. A device for discharging elongated articles from the hot bath of a kettle furnace having loading and conveying means each successively feeding the elongated articles in turn laterally of their longitudinal axis into and through the bath, characterized by a discharge seat means immersed in said bath to receive in turn each article fed laterally of its longitudinal axis from said loading and conveying means, and article discharge actuating means to move each elongated article longitudinally of its axis from said immersed discharge seat means and out of the bath.

7. The article discharge device of claim 6 characterized in that said article discharge actuating means comprises a rotary driven eccentric wheel that raises one end of the elongated article out of the bath for discharge longitudinally of its axis.

8. The article discharge device of claim 6 characterized in that said discharge seat means are at least two aligned grooved peripheries of spaced wheels and said article discharge actuating means are rotary driven means eccentrically supporting said wheels, one end of each article being lowered while the other end is raised to lift one end of each article higher than the other and discharge it longitudinally of its axis.

9. The article discharge device of claim 8 characterized in that said eccentric wheels are rotated in the same direction to feed the article longitudinally of its axis in the direction toward the eccentric that raises the article.

10. The article discharge device of claim 6 characterized in that said article discharge actuating means comprises a lift means to raise the elongated article above the bath for discharge longitudinally of its axis.

11. The article discharge device of claim 10 characterized in that said lift means is a hook to raise one end.

12. The article discharge device of claim 10 characterized in that said lift means is an elevator.

13. The article discharge device of claim 6 characterized in that said article discharge actuating means is an endless chain means with an abutment means projecting into the bath to engage one end of each article in turn to move it longitudinally of its axis out of the bath.

14. The article discharge device of claim 13 characterized by a gate operable to open the kettle below the surface of the bath to permit the article to be discharged therefrom longitudinally of the axis of the article.

15. The article discharge device of claim 14 which also includes a sump outside of said gate to catch the bath discharged with the article, and pump means to return the discharged bath from the sump to said kettle.

References Cited in the file of this patent

UNITED STATES PATENTS

| | | |
|---|---|---|
| 790,580 | Kurtz | May 23, 1905 |
| 1,004,998 | Crecelius | Oct. 3, 1911 |
| 1,056,738 | Catlett | Mar. 18, 1913 |
| 1,465,085 | Macabee | Aug. 14, 1923 |
| 1,570,949 | Cunningham | Jan. 26, 1926 |
| 1,631,125 | Happel | June 7, 1927 |
| 1,653,648 | Malocsay | Dec. 27, 1927 |
| 1,688,123 | Levy | Oct. 16, 1928 |
| 1,700,697 | Draper | Jan. 29, 1929 |
| 1,776,420 | Eichenberger | Sept. 23, 1930 |
| 1,997,013 | Potthoff | Apr. 9, 1935 |
| 2,092,938 | Stebler | Sept. 14, 1937 |
| 2,159,619 | Lisle | May 23, 1939 |
| 2,249,792 | Skinner | July 22, 1941 |
| 2,355,249 | Szabo | Aug. 8, 1944 |
| 2,442,484 | Chamberlin | June 1, 1948 |
| 2,522,071 | Tait | Sept. 12, 1950 |
| 2,630,908 | Anderson | Mar. 10, 1953 |
| 2,642,834 | Pearson | June 23, 1953 |

FOREIGN PATENTS

| | | |
|---|---|---|
| 490,675 | Germany | Jan. 30, 1930 |